US008638493B2

(12) United States Patent
Ryf

(10) Patent No.: US 8,638,493 B2
(45) Date of Patent: Jan. 28, 2014

(54) OPTICAL SYSTEM FOR SIGNAL AMPLIFICATION USING A MULTIMODE FIBER

(75) Inventor: Roland Ryf, Aberdeen, NJ (US)

(73) Assignee: Alcatel Lucent, Paris (FR)

( * ) Notice: Subject to any disclaimer, the term of this patent is extended or adjusted under 35 U.S.C. 154(b) by 69 days.

(21) Appl. No.: 13/234,475

(22) Filed: Sep. 16, 2011

(65) Prior Publication Data

US 2013/0070330 A1    Mar. 21, 2013

(51) Int. Cl.
*H01S 3/09* (2006.01)
*H01S 3/30* (2006.01)

(52) U.S. Cl.
USPC ........................................ 359/341.3; 359/334

(58) Field of Classification Search
USPC .............................. 359/334, 341.1, 340, 341.3
See application file for complete search history.

(56) References Cited

U.S. PATENT DOCUMENTS

| | | | |
|---|---|---|---|
| 6,556,346 B1 | 4/2003 | Di Pasquale et al. | |
| 7,991,022 B1 | 8/2011 | Soh et al. | |
| 2007/0064304 A1 | 3/2007 | Brennan, III et al. | |
| 2008/0170289 A1* | 7/2008 | Rice et al. | 359/334 |
| 2008/0180787 A1* | 7/2008 | DiGiovanni et al. | 359/334 |
| 2010/0329670 A1 | 12/2010 | Essiambre et al. | |
| 2010/0329671 A1 | 12/2010 | Essiambre et al. | |
| 2012/0105947 A1* | 5/2012 | Kashiwagi et al. | 359/341.3 |
| 2012/0262780 A1* | 10/2012 | Bai et al. | 359/337.11 |

FOREIGN PATENT DOCUMENTS

EP    1508985 A1    2/2005

OTHER PUBLICATIONS

Ryf, Roland, "Scalable Waveguide-Mode Coupler for an Optical Receiver or Transmitter," U.S. Appl. No. 12/986,468, filed Jan. 7, 2010 (25 pages).
Ryf, Roland, "Waveguide Coupler for Optical Transverse-Mode Multiplexing," U.S. Appl. No. 12/827,284, filed Jun. 30, 2010 (30 pages).
International Search Report and Written Opinion; Mailed Feb. 27, 2013 for corresponding PCT Application No. PCT/US2012/054708.
Li, Libo, et al., "Transverse-Mode Controlling of a Large-Mode-Area Multimode Fiber Laser" Chin. Opt. Lett. 5, 524-526 (2007).

* cited by examiner

*Primary Examiner* — Mark Hellner
(74) *Attorney, Agent, or Firm* — Mendelsohn, Drucker & Dunleavy, P.C.; Yuri A. Gruzdkov; Steve Mendelsohn

(57) ABSTRACT

An optical coupler for coupling optical-pump power into a multimode fiber configured to transport an optical space-division-multiplexed (SDM) signal, the coupling being performed in a manner that enables amplification of the SDM signal in the multimode fiber via a stimulated-emission process or a stimulated Raman-scattering process. The optical coupler can be a part of an optical transmitter configured for co-directional pumping, an optical receiver configured for contra-directional pumping, or a relay station disposed within an optical communication link and configured for either type of pumping. The optical coupler can advantageously be used, e.g., to offset the different degrees of attenuation to which the SDM-signal components corresponding to different guided modes of the multimode fiber are subjected to therein.

22 Claims, 10 Drawing Sheets
(4 of 10 Drawing Sheet(s) Filed in Color)

OPTICAL SYSTEM FOR SIGNAL AMPLIFICATION USING A MULTIMODE FIBER

CROSS-REFERENCE TO RELATED APPLICATIONS

The subject matter of this application is related to that of U.S. patent application Publication No. 2013/0068937, which is incorporated herein by reference in its entirety.

BACKGROUND

1. Field of the Invention

The present invention relates to optical equipment and, more specifically but not exclusively, to optical fiber amplifiers.

2. Description of the Related Art

This section introduces aspects that may help facilitate a better understanding of the invention(s). Accordingly, the statements of this section are to be read in this light and are not to be understood as admissions about what is in the prior art or what is not in the prior art.

An optical amplifier is a device that amplifies an optical signal directly in the optical domain without converting the optical signal into a corresponding electrical signal. Optical amplifiers are widely used, for example, in the fields of optical communications and laser physics.

One type of an optical amplifier is a doped-fiber amplifier, with a well-known example being the Erbium-doped fiber amplifier (EDFA). In operation, a signal to be amplified and a pump beam are multiplexed into the doped fiber. The pump beam excites the doping ions, and amplification of the signal is achieved by stimulated emission of photons from the excited dopant ions.

Another type of an optical amplifier is a Raman amplifier, which relies on stimulated Raman scattering (SRS) for signal amplification. More specifically, when a signal to be amplified and a pump beam are multiplexed into an optical fiber made of an appropriate material, a lower-frequency signal photon induces SRS of a higher-frequency pump photon, which causes the pump photon to pass some of its energy to the vibrational states of the fiber material, thereby converting the pump photon into an additional signal photon. The pump beam may be coupled into the fiber in the same direction as the signal (co-directional pumping) or in the opposite direction (contra-directional pumping).

SUMMARY

Disclosed herein are various embodiments of an optical coupler for coupling optical-pump power into a multimode fiber configured to transport an optical space-division-multiplexed (SDM) signal, said coupling being performed in a manner that enables amplification of the SDM signal in the multimode fiber via, for example, a stimulated-emission process or a stimulated Raman-scattering process. The optical coupler can be, for example, a part of an optical transmitter configured for co-directional pumping, an optical receiver configured for contra-directional pumping, or a relay station disposed within an optical communication link and configured for either type of pumping. The optical coupler can advantageously be used, e.g., to offset the different degrees of attenuation to which the SDM-signal components corresponding to different guided modes of the multimode fiber are subjected to therein.

According to one embodiment, provided is an apparatus comprising a first optical coupler that is configured to pass an optical beam carrying an optical signal corresponding to a set of guided modes of a first multimode fiber and couple optical-pump power into the first multimode fiber so as to partition the optical-pump power among the guided modes of said set.

In some embodiments of the above apparatus, the apparatus may further comprise a segment of the first multimode fiber.

In some embodiments of any of the above apparatus, the segment of the first multimode fiber may be adapted to transfer optical-pump energy to the optical signal via a stimulated Raman-scattering process.

In some embodiments of any of the above apparatus, the segment of the first multimode fiber may be adapted to transfer optical-pump energy to the optical signal via a stimulated emission process.

In some embodiments of any of the above apparatus, the guided modes may comprise a fundamental mode and a higher-order mode; and the first optical coupler may be configured to couple a greater portion of the optical-pump power into the higher-order mode than into the fundamental mode.

In some embodiments of any of the above apparatus, the first optical coupler may comprise a phase mask configured to phase-filter a first optical-pump beam to generate a first phase-filtered beam whose phase varies over a transverse cross section thereof; and the first optical coupler may be configured to apply the first phase-filtered beam to an end of the first multimode fiber.

In some embodiments of any of the above apparatus, the first optical coupler may further comprise a beam combiner configured to spatially overlap the first phase-filtered beam and the optical beam carrying the optical signal.

In some embodiments of any of the above apparatus, the first optical coupler may further comprise a polarization scrambler configured to cause the first optical-pump beam to have scrambled polarization.

In some embodiments of any of the above apparatus, the first optical coupler may further comprises an array of waveguides, wherein a first waveguide of the array is configured to output the first optical-pump beam; and a second waveguide of the array is configured to output a second optical-pump beam; the phase mask may be further configured to phase-filter the second optical-pump beam to generate a second phase-filtered beam whose phase varies over a transverse cross section thereof; and the first optical coupler may be further configured to apply the second phase-filtered beam to the end of the first multimode fiber.

In some embodiments of any of the above apparatus, the first optical coupler may be configured to apply the second phase-filtered beam to a substantially separate region on said end than the first phase-filtered beam.

In some embodiments of any of the above apparatus, the apparatus may further comprise an optical-pump source configured to cause the first optical-pump beam to have a first wavelength, and to cause the second optical-pump beam to have a second wavelength different from the first wavelength.

In some embodiments of any of the above apparatus, the first optical coupler may further comprise an adjustable mechanical structure reconfigurable to change a relative position of the first optical-pump beam and the phase mask.

In some embodiments of any of the above apparatus, the first optical coupler may further comprise at least one of: a module including a bulk optical element and a mechanically adjustable element configured to change location of a spot illuminated by the first phase-filtered beam on said end; and a module including a bulk optical element and a mechanically adjustable element for changing a size of said spot.

In some embodiments of any of the above apparatus, the optical phase mask may comprise: a first area configured to impose a first constant phase shift on light propagating therethrough; and a second area configured to impose a second constant phase shift on light propagating therethrough, wherein the second phase shift is different from the first phase shift.

In some embodiments of any of the above apparatus, the apparatus may comprise an optical receiver, wherein the first optical coupler is a part of the receiver.

In some embodiments of any of the above apparatus, the apparatus may comprise an optical transmitter, wherein the first optical coupler is a part of the transmitter.

In some embodiments of any of the above apparatus, the apparatus may comprise a fiber amplifier, wherein the first optical coupler is a part of the fiber amplifier.

In some embodiments of any of the above apparatus, the apparatus may comprise a relay station adapted to transport the optical beam carrying the optical signal between said end of the first multimode fiber and an end of a second multimode fiber, wherein the first optical coupler is a part of the relay station.

In some embodiments of any of the above apparatus, the relay station may comprise a second optical coupler configured to couple optical-pump power of a second optical pump into the second multimode fiber through the end thereof, wherein the second optical coupler is configured to partition the optical-pump power of the second optical pump among guided modes of the second multimode fiber populated therein by the optical signal.

In some embodiments of any of the above apparatus, the first optical coupler and the second optical coupler may include a shared beam combiner configured to direct in opposite directions the optical power of the first optical pump and the optical power of the second optical pump.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Other aspects, features, and benefits of various embodiments of the invention will become more fully apparent, by way of example, from the following detailed description and the accompanying drawings, in which.

DETAILED DESCRIPTION

A multimode fiber can provide a higher transmission capacity than a single-mode fiber by means of space-division multiplexing (SDM), wherein different guided modes of the multimode fiber are populated with different modulated optical signals or different combinations of a given set of modulated optical signals. Long-distance transport of SDM signals over multimode fibers can greatly benefit from the use of multimode-fiber amplifiers. However, a typical prior-art doped-fiber or Raman amplifier employs, as an optical-gain medium, a single-mode fiber and, as such, is unsuitable for SDM signals.

These and other pertinent problems in the prior art are addressed by various embodiments of a multimode-fiber (MMF) amplifier that can be used, e.g., to amplify SDM optical signals transported through a multimode-fiber link. Depending on the material of the fiber and configuration of the optical pumps, the MMF amplifier can amplify optical signals via a stimulated-emission process or a stimulated Raman-scattering (SRS) process. Advantageously, various embodiments of the invention provide a cost-effective solution for long-distance transport of optical-communication signals over MMF links.

Figure 1:
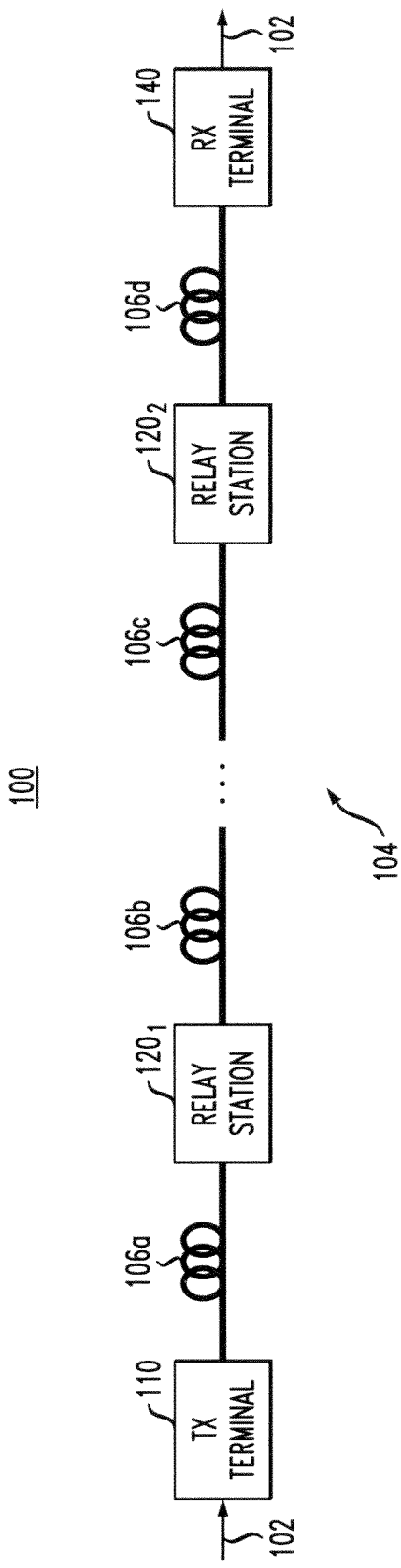
FIG. 1 shows a block diagram of an optical transport system according to one embodiment of the invention.

FIG. 1 shows a block diagram of an optical transport system 100 according to one embodiment of the invention. System 100 has a transmitter terminal 110 and a receiver terminal 140 connected to one another via an optical transport link 104. Link 104 is illustratively shown as having four sections 106a-106d of multimode optical fiber and two relay stations 120$_1$-120$_2$. In alternative embodiments, link 104 may have a different number of fiber sections 106 and/or a different number of relay stations 120. Various additional components, such as optical routing elements, variable optical attenuators, lumped optical amplifiers, optical add-drop multiplexers, optical filters, and the like, may be incorporated into link 104 as appropriate or necessary.

In one embodiment, one or more of the multimode fiber of sections 106 comprise(s) a segment of doped multimode fiber, such as an Erbium-doped multimode fiber. When appropriately pumped by pump light from transmitter terminal 110 and/or relay station(s) 120, fiber section 106 operates as a distributed fiber amplifier, e.g., a distributed Erbium-doped MMF amplifier.

In another embodiment, the multimode fiber of section 106 comprises a multimode fiber suitable for Raman amplification of optical signals. When appropriately pumped by pump light from transmitter terminal 110, receiver terminal 140, and/or relay station(s) 120, fiber section 106 operates as a distributed MMF Raman amplifier.

In some embodiments, the above-described MMF amplifier(s) may be formed by multimode fiber segments located in the transmitter terminal 110, receiver terminal 140, and/or relay station(s) 120, Transmitter terminal 110 is configured to receive one or more input data streams 102 and generate a corresponding SDM optical output signal that is applied to fiber section 106a to carry the data of the input data stream(s), via link 104, to receiver terminal 140. In one embodiment, transmitter terminal 110 includes an optical-pump coupler (not explicitly shown in FIG. 1) configured to couple one or more optical-pump beams into fiber section 106a for co-directional pumping and amplification of the SDM signal in that fiber section. A representative optical-pump coupler that can be used in transmitter terminal 110 is described in more detail below in reference to FIGS. 4-7.

Receiver terminal 140 is configured to receive an SDM signal from fiber section 106d and to process that signal to recover the data of data stream(s) 102. In one embodiment, receiver terminal 140 includes an optical-pump coupler (not explicitly shown in FIG. 1) configured to couple one or more optical pump beams into fiber section 106d for contra-directional pumping and amplification of the SDM signal in that fiber section. A representative optical-pump coupler that can be used in receiver terminal 140 is described in more detail below in reference to FIG. 8.

Each relay station 120 may include an optical-pump coupler (not explicitly shown in FIG. 1) configured to couple one or more optical pump beams into one or both of adjacent fiber sections 106. For example, the optical-pump coupler of relay station $120_1$ may be configured to couple one or more optical pump beams into fiber section 106a for contra-directional pumping and amplification of the SDM signal in that fiber section. Alternatively or in addition, the optical-pump coupler of relay station $120_1$ may be configured to couple one or more optical pump beams into fiber section 106b for co-directional pumping and amplification of the SDM signal in that fiber section. A representative optical-pump coupler that can be used in a relay station 120 is described in more detail below in reference to FIG. 9.

In general, there are two broad classes of fiber modes: radiation modes and guided modes. Radiation modes carry energy out of the fiber core, which is then quickly dissipated. Radiation modes will not be considered here. Guided modes are primarily confined to the fiber core, and propagate energy along the fiber, thereby transporting information and power. Each guided mode has its own distinct velocity and can be further decomposed into two orthogonally polarized components. Any field distribution within the optical fiber can generally be expressed as a combination of guided modes.

For a given wavelength λ, an optical fiber, such as that used in fiber sections 106 of system 100, can typically support multiple guided modes if the normalized frequency parameter (V, also referred to as the V number) is greater than 2.405. Eq. (1) gives the expression for V:

$$V = \frac{2\pi a}{\lambda} NA \quad (1)$$

where a is the fiber-core radius, and NA is the numerical aperture. For a step-index fiber, the numerical aperture is given by Eq. (2):

$$NA = \sqrt{n_1^2 - n_2^2} \quad (2)$$

where $n_1$ is the refractive index of the fiber core, and $n_2$ is the refractive index of the fiber cladding.

The guided modes can be generally classified as (i) transverse electric (TE) modes, for which the axial component of the electric field is zero; (ii) transverse magnetic (TM) modes, for which the axial component of the magnetic field is zero; and (iii) HE or EH modes, for which neither the axial component of the electric field nor the axial component of the magnetic field is zero. The designation of HE or EH depends on whether the electric or magnetic field component is dominant.

The order of the guided modes in a multimode fiber can be defined based on one or more of the following: (i) the number of intensity lobes in the transverse plane, (ii) group velocity, and (iii) the magnitude of the longitudinal wavevector. The lowest-order or fundamental mode typically has a single intensity lobe, the highest group velocity, and the largest longitudinal wavevector. The remaining (higher-order) modes are typically ordered based on the magnitude of their longitudinal wavevectors. For some waveguide cross-sections and V numbers, one of the remaining two criteria may need to be invoked to determine the relative order of some modes.

The refractive-index profiles of most step-index optical fibers used in communication links, such as link 104 in system 100, have a relatively small (e.g., smaller than about 0.05) contrast Δ, which makes these fibers only weakly guiding. Eq. (3) gives the definition of Δ for a step-index fiber:

$$\Delta = \frac{n_1 - n_2}{n_1} \quad (3)$$

In the approximation of weak guidance for generally cylindrical fibers, the TE, TM, HE, and EH guided modes become the modes that are referred to as the linearly polarized (LP) modes.

The following notation is usually adhered to in the description of the LP modes. Each LP mode is designated using two integer indices, e.g., in the form of subscripts: $LP_{jk}$. The first integer index (j) gives the number of 2π-sized phase increments in the electric field per one azimuthal rotation about the fiber axis (e.g., the Z-coordinate axis). The second integer index (k) gives the number of electric-field nodes in the radial dimension, with the zero field at the outer edge of the field distribution counted as a radial node. Some of the LP modes are also given a designating letter, e.g., a, b, etc., that follows the two integer indices to designate certain degenerate modes. As already indicated above, each LP mode can have two different polarizations, e.g., an X polarization and a Y polarization, where X and Y are the two transverse (i.e., orthogonal to the fiber axis) coordinate axes.

Figure 2:
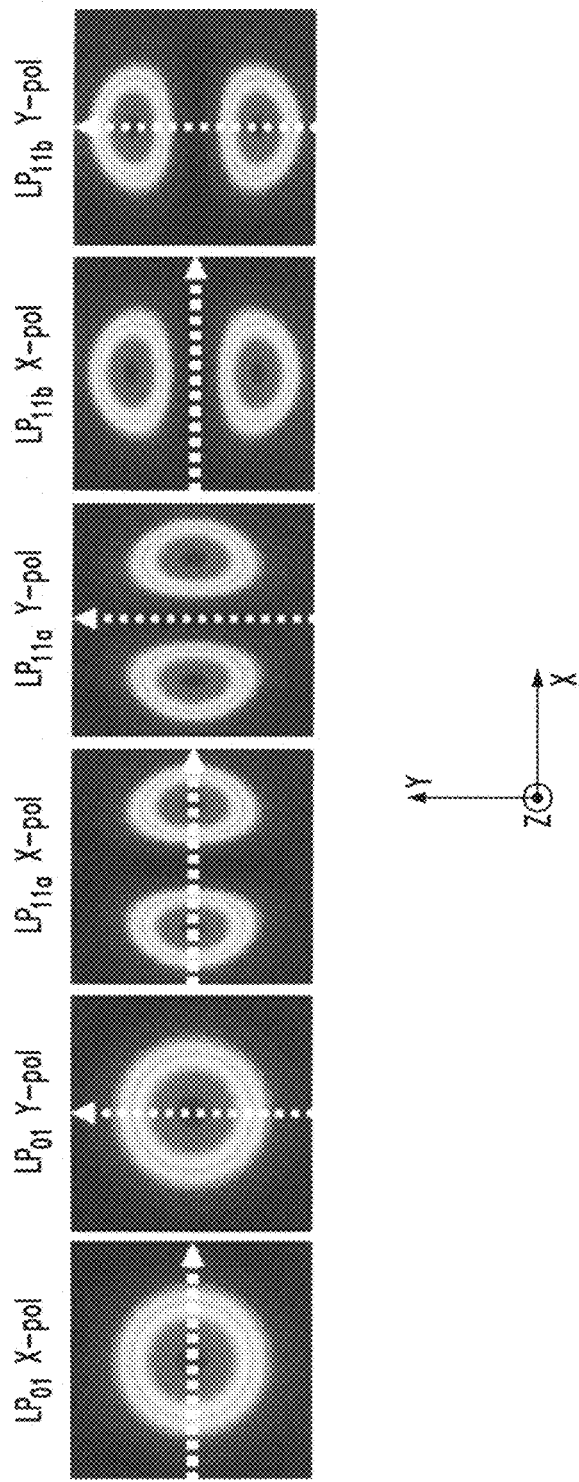
FIG. 2 shows representative intensity distributions and polarizations for the three lowest linearly polarized (LP) modes of a multimode fiber that can be used in the system of FIG. 1 according to one embodiment of the invention.

FIG. 2 graphically shows representative intensity distributions and polarizations for the three lowest LP modes of a multimode fiber that can be used in link 104 according to one embodiment of the invention. The intensity distributions are color-coded so that (i) the dark blue color corresponds to the zero intensity, (ii) the dark red color corresponds to the highest intensity, and (iii) the colors in between correspond to the intermediate intensities in the rainbow-like progression from blue to red. The dotted arrows indicate the respective electric-field polarizations for different modes. Each of the shown LP modes is doubly degenerate, with the same intensity distribution corresponding to each of two orthogonal (e.g., X and Y) polarizations.

The fundamental mode ($LP_{01}$) has an intensity profile that is similar to that of a Gaussian beam. The $LP_{01}$ mode corresponds to the $HE_{11}$ mode of a strongly guiding fiber.

The next lowest-order mode ($LP_{11}$) has an intensity profile comprising two intensity peaks characterized by a phase difference of 180 degrees between the corresponding electric fields. In the $LP_{11a}$ mode, the intensity peaks are lined up along the X-axis. In the $LP_{11b}$ mode, the intensity peaks are similarly lined up along the Y-axis. The different degenerate states of the $LP_{11a}$ and $LP_{11b}$ modes correspond to different linear combinations of the $TE_{01}$, $TM_{01}$, and $HE_{21}$ modes of a strongly guiding fiber. If the V number (see Eq. (1)) is in the range between 2.405 and about 3.9, then the $LP_{01}$, $LP_{11a}$, and $LP_{11b}$ modes are typically the only guided modes supported by the fiber. In this case, the fiber is referred to as a three-mode (3M) fiber.

Figure 3:
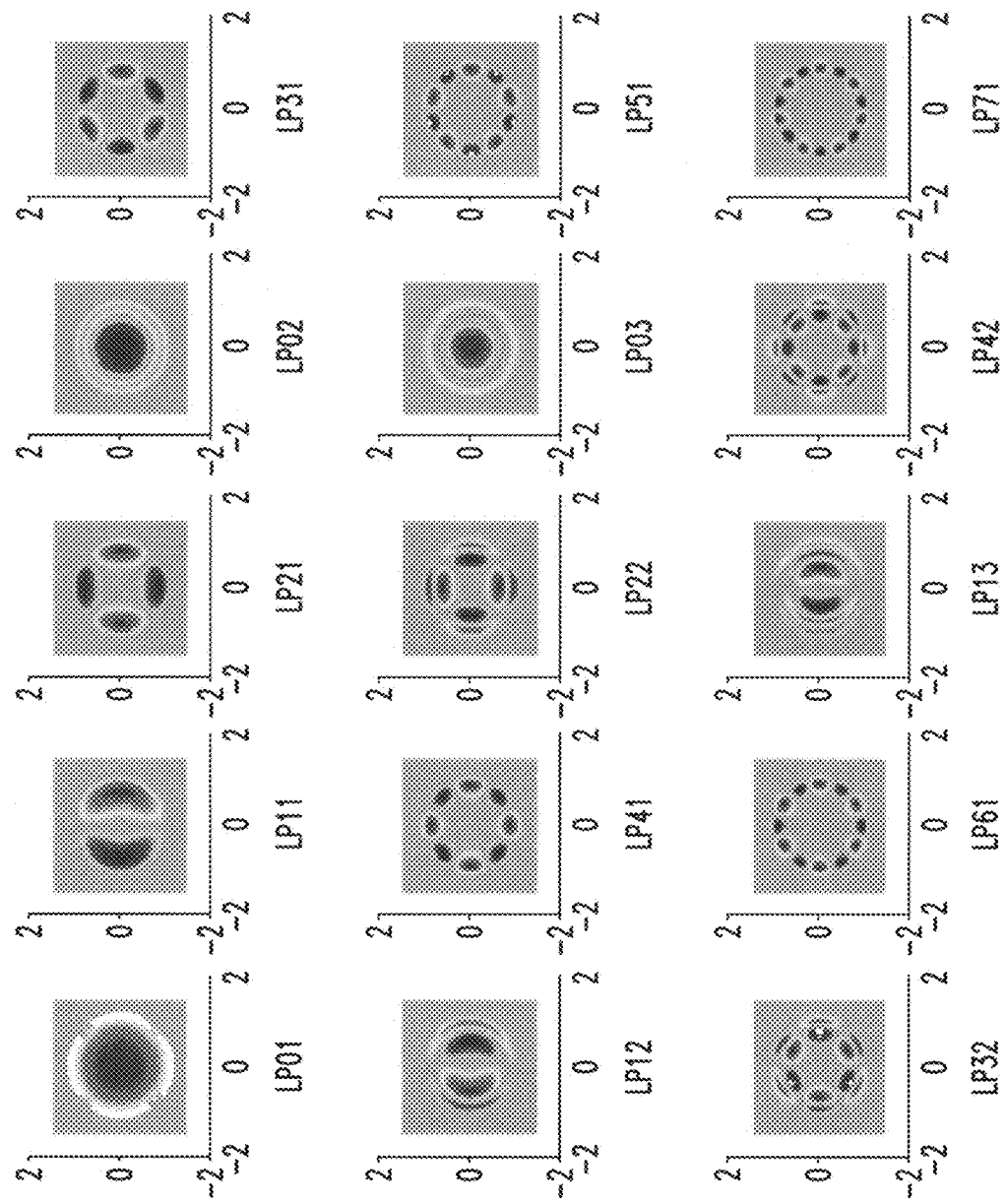
FIG. 3 shows representative phase/field-strength (PFS) patterns for several LP modes of a multimode fiber that can be used in the system of FIG. 1 according to another embodiment of the invention.

FIG. 3 graphically shows representative phase/field-strength (PFS) patterns for several LP modes of a multimode fiber that can be used in link 104 according to another embodiment of the invention. Each PFS pattern is color-coded using a color scheme in which: (i) the degree of color saturation represents the optical-field strength and (ii) the color itself represents the phase of the electric field. For example, the light red color corresponds to lower optical-field strength than the dark red color. A rainbow-like change in color from blue to red represents a continuous change in the relative phase from $-\pi$ to $+\pi$.

PFS patterns for different states of degenerate LP modes can be obtained by appropriately rotating the PFS patterns shown in FIG. 3. For example, the PFS pattern for the $LP_{11b}$ mode (see FIG. 2) can be obtained by rotating by 90 degrees the PFS pattern shown in the second-from-the-left panel in the top row of FIG. 3. The intensity distribution for the LP mode can be obtained by calculating a square of the absolute values of the corresponding PFS pattern. For example, the intensity distribution for the $LP_{01}$ mode shown in the leftmost panel of FIG. 2 can be obtained by calculating a square of the absolute values of the PFS pattern shown in the leftmost panel in the top row of FIG. 3. Similarly, the intensity distribution for the $LP_{11a}$ mode shown in the third-from-the-left panel of FIG. 2 can be obtained by calculating a square of the absolute values of the PFS pattern shown in the second-from-the-left panel in the top row of FIG. 3.

To efficiently and selectively couple light into a particular LP mode of a multimode fiber, the PFS pattern and polarization created by a light source at an end facet of the fiber should approximate closely the PFS pattern and polarization of that LP mode. In particular the light that does not match the appropriate PFS pattern and polarization may be coupled into a different LP mode, be coupled to a radiation mode, and/or be reflected back from the end facet of the multimode fiber. For example, to efficiently and selectively couple light into the X-polarized $LP_{11a}$ mode, the corresponding light source should be configured to create a PFS pattern that closely approximates the PFS pattern shown in the second-from-the-left panel in the top row of FIG. 3 and the polarization shown in the third-from-the-left panel of FIG. 2.

For brevity and clarity reasons, the description of various embodiments is presented below in reference to a 3M fiber and the corresponding LP modes. However, embodiments of the invention are not so limited. From the provided description, one of ordinary skill in the art will be able to make and use various embodiments of the invention with any suitable multimode fiber, including a strongly guiding multimode fiber whose guided modes are the corresponding TE, TM, HE, and EH modes, rather than the LP modes illustrated in FIGS. 2 and 3.

Figure 4:
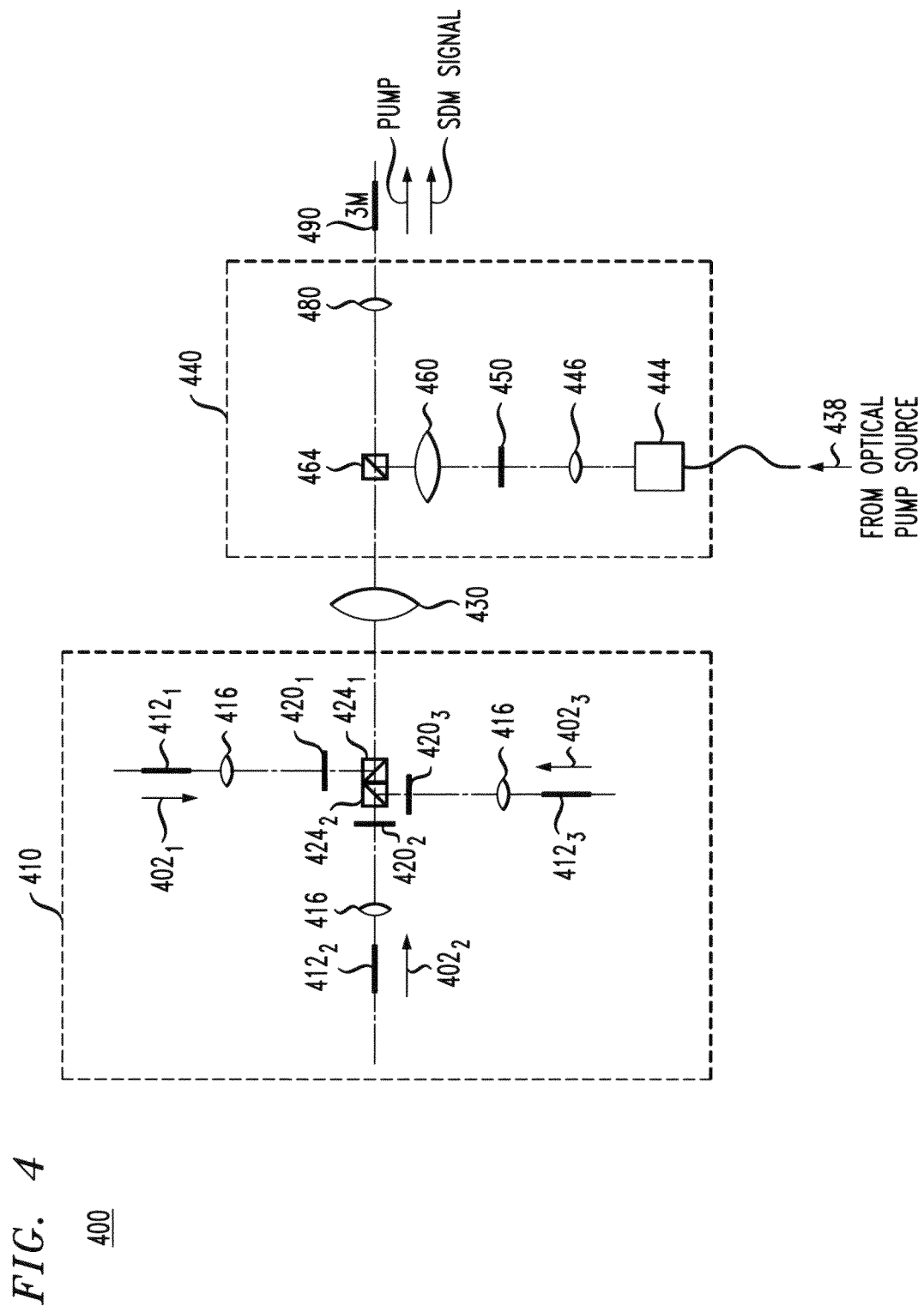
FIG. 4 shows a block diagram of an optical module that can be used in the transmitter terminal of the transport system shown in FIG. 1 according to one embodiment of the invention.

FIG. 4 shows a block diagram of an optical module 400 that can be used in transmitter terminal 110 (FIG. 1) according to one embodiment of the invention. Module 400 comprises an optical-signal coupler 410 and an optical-pump coupler 440. Optical-signal coupler 410 is configured to generate an SDM signal and present that signal for coupling into an output 3M fiber 490. Optical-pump coupler 440 is configured to couple an optical-pump signal into fiber 490 to provide optical power for distributed amplification therein of the SDM signal generated by optical-signal coupler 410. In one embodiment, 3M fiber 490 can be, e.g., a part of fiber section 106a in system 100 (FIG. 1). The configuration of optical module 400 shown in FIG. 4 can be used for co-directional pumping of a stimulated-emission amplification process or an SRS amplification process.

Optical-signal coupler 410 has three fibers $412_1$-$412_3$, e.g., single mode optical fibers, each configured to deliver a corresponding one of independently modulated optical input signals $402_1$-$402_3$. Each of signals $402_1$-$402_3$ can be, e.g., a polarization-division multiplexed (PDM) signal having two independently modulated polarization components. For each fiber 412, coupler 410 has a respective lens 416 configured to collimate the respective diverging light beam produced by the fiber. Each of the resulting collimated beams passes through a respective one of phase masks $420_1$-$420_3$ to create a corresponding phase-filtered beam.

Optical-signal coupler 410 further has two beam combiners $424_1$ and $424_2$. Combiner $424_2$ is configured to spatially superimpose the phase-filtered beams produced by phase masks $420_2$ and $420_3$, while combiner $424_1$ is configured to spatially superimpose the phase-filtered beam produced by phase mask $420_1$ with the superimposed beam from combiner $424_2$ and direct the resulting superimposed beam toward a lens 430. Lens 430 together with lenses 416 and 480 (the latter located in optical-pump coupler 440) form an optical relay system configured to (i) relay the superimposed beam to fiber 490 and (ii) appropriately image the beam onto the end facet of the fiber.

Depending on the LP modes assigned to signals $402_1$-$402_3$, each of phase masks $420_1$-$420_3$ is configured to have a corresponding phase-shift pattern that produces an appropriate PFS pattern at the end facet of output fiber 490 to enable efficient and selective coupling of the signal into the assigned LP mode. For example, if signal $402_1$ is assigned the $LP_{11a}$ mode of fiber 490, then phase mask $420_1$ is configured to have a phase-shift pattern that causes, at the end facet of fiber 490, the appropriately oriented PFS pattern shown in the second-from-the-left panel in the top row of FIG. 3. If signal $402_2$ is assigned the $LP_{11b}$ mode of fiber 490, then phase mask $420_2$ is configured to have a phase-shift pattern that causes, at the end facet of fiber 490, a PFS pattern that is similar to the PFS pattern created by phase mask $420_2$ for signal $402_1$ but rotated with respect to it by 90 degrees. If signal $402_3$ is assigned the $LP_{01}$ mode of fiber 490, then phase mask $420_3$ may be omitted or configured to impose a constant phase shift. The latter characteristic is due to the spatial similarity of the PFS patterns corresponding to the fundamental mode of a single-mode fiber, such as single-mode fiber $412_3$, and the $LP_{01}$ mode of a 3M fiber, such as fiber 490.

Representative optical-signal couplers that can be used to implement (i) various embodiments and/or features of optical-signal coupler 410 and (ii) representative SDM transmitters that may be used to implement transmitter terminal 110 (FIG. 1) are disclosed, e.g., in U.S. Patent Application Publication No. 2010/0329670 and/or 2010/0329671 and/or U.S. patent application Ser. No. 12/986,468, filed on Jan. 7, 2011, and/or Ser. No. 12/827,284, filed on Jun. 30, 2010, and/or in U.S. patent application, titled "OPTICAL MODE COUPLERS FOR MULTI-MODE OPTICAL FIBERS" by Roland Ryf, filed on Sep. 16, 2011 All of the U.S. patent applications and U.S. patent application Publications listed in this paragraph are incorporated herein by reference in their entirety.

Different LP modes are generally subjected to different degrees of attenuation in a multimode fiber, with the higher-order modes typically being subjected to stronger attenuation than the lower-order modes. However, a desired characteristic of an optical link, such as link 104 (FIG. 1), is often about a 0-db net gain. This dB number implies that it is often beneficial when signal attenuation in the link is substantially canceled or compensated to a significant degree by signal amplification in the link.

For efficient energy transfer from an optical-pump signal to a communication signal in a multimode fiber, the two signals should preferably populate the same LP mode of that fiber. This preferable condition is mostly due to the spatial orthogonality of different LP modes and/or their different group velocities. However, ther is typically no particular relative phase condition that is strongly preferred for the optical-pump and communication signals by the underlying physics of the stimulated-emission process or the SRS process. The modal-amplification gain typically strongly depends on the partial power of the optical-pump signal residing in the mode. To offset the different degrees of attenuation of different LP modes, it is therefore desirable for an optical-pump coupler, such as optical-pump coupler 440, to enable a specified uneven partition of the optical-pump power between different LP modes while preferably about minimizing optical-pump reflections from the end facet of the fiber. It is also usually desirable for the optical-pump coupler to be relatively robust and inexpensive. These and other pertinent technical problems may be addressed herein by some of the different embodiments of optical-pump couplers, of which optical-pump coupler 440 is an example.

Optical-pump coupler 440 is configured to receive an optical-pump signal 438 from an external optical-pump source (e.g., a laser, not explicitly shown in FIG. 4). Signal 438 passes through a polarization scrambler 444 configured to evenly distribute the optical power of that signal between different polarizations. In various embodiments, polarization scrambler 444 can be fiber-based or implemented using free-space optics. In the various embodiments, polarization scrambler 444 may be optional and, as such, may be omitted.

A possibly diverging light beam exiting the output port of polarization scrambler 444 may be collimated by a lens 446. The resulting collimated beam passes through a phase mask 450 to produce a corresponding phase-filtered beam. A dichroic beam combiner 464 or another wavelength dependent optical combiner turns the phase-filtered beam toward fiber 490 and also spatially superimposes it with the SDM signal that is being relayed from optical-signal coupler 410 toward the fiber. A lens 460 may optionally be disposed between phase mask 450 and combiner 464, i.e., to perform a functionality similar to that of lens 430. More specifically, lenses 446, 460, and 480 are usually used to form an optical-relay system configured to (i) relay the phase-filtered pump beam to fiber 490, (ii) appropriately compress the diameter of that beam, and (iii) appropriately position the optically compressed-beam spot on the end facet for coupling the pump power into the fiber.

Figure 5:
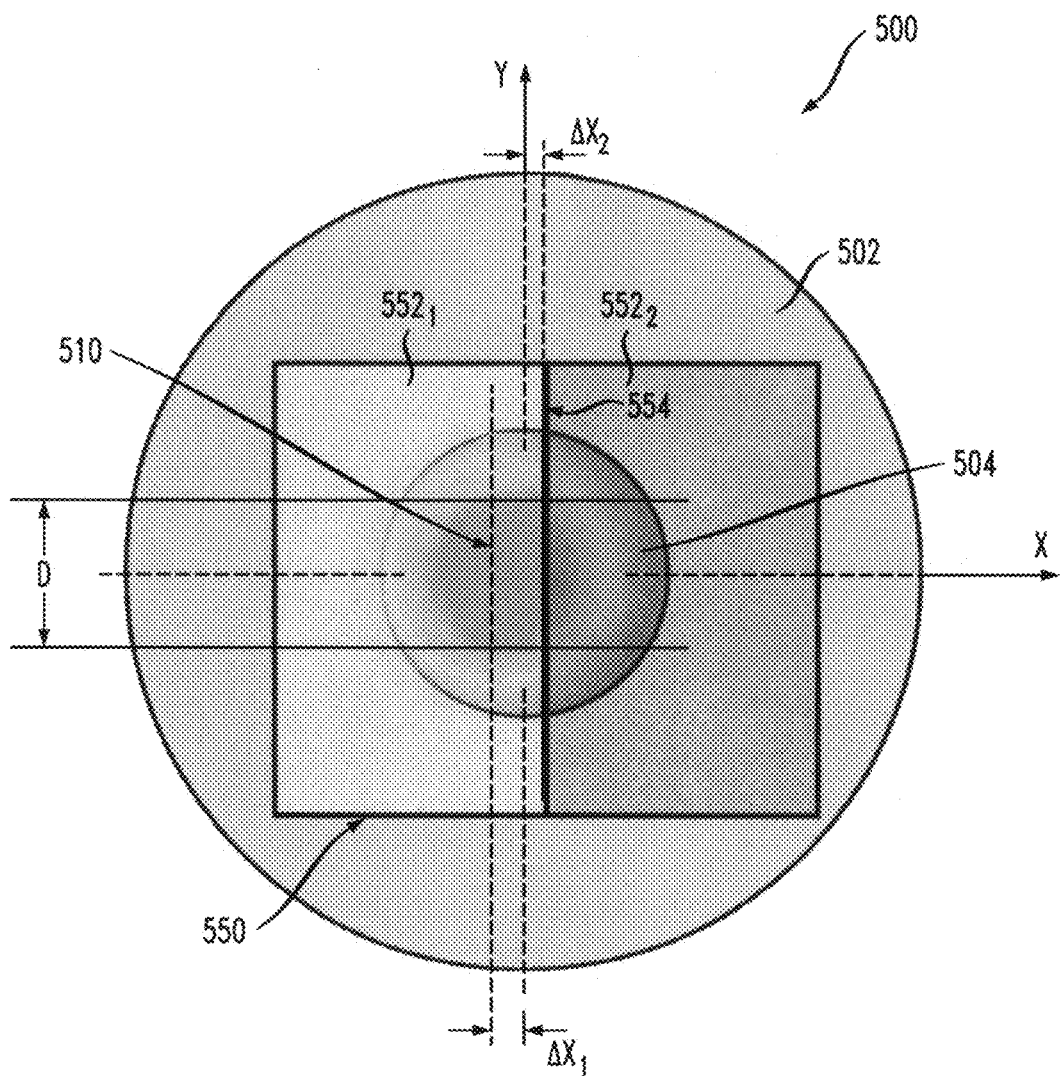
FIG. 5 shows an end facet of a multimode fiber with a pump-beam spot and a corresponding phase pattern according to a representative configuration of the optical module shown in FIG. 4.

FIG. 5 shows an end facet 500 of fiber 490 together with a pump-beam spot 510 and a corresponding phase-shift pattern 550 according to a representative configuration of optical-pump coupler 440 (FIG. 4). End facet 500 typically has a circular shape and comprises a cladding area 502 and a core area 504. The overlaid X- and Y-coordinate axes, shown in FIG. 5 by the dashed lines, provide a coordinate frame, with the origin of that frame being located at the geometric center of end facet 500 (although that origin is not explicitly represented in FIG. 5).

Pump-beam spot 510 usually has an about circular shape characterized by an approximately Gaussian intensity distribution within it. For such a profile, about 90% of the optical power of spot 510 is typically concentrated within diameter D, as indicated in FIG. 5. The geometric center of spot 510 may be offset by distance $\Delta x_1$ from the geometric center of end facet 500 along the X-coordinate axis, but is typically not offset along the Y-coordinate axis. In another configuration, the geometric center of spot 510 can alternatively or additionally be offset by distance $\Delta y_1$ (not shown in FIG. 5) from the geometric center of end facet 500 along the Y-coordinate axis.

Phase-shift pattern 550 is imposed by phase mask 450 (FIG. 4) and, as such, corresponds approximately to the phase-shift pattern of that phase mask. In this particular example, phase mask 450 is a binary phase mask having two portions, each imposing a corresponding constant phase shift with a phase-shift difference of about 180 degrees between the portions. As a result, phase-shift pattern 550 has two areas labeled $552_1$ and $552_2$, respectively, e.g., rectangular areas, with one area corresponding to a relative phase shift of about 0 degrees, and the other area corresponding to a relative phase shift of about 180 degrees. Phase mask 450 is oriented so that a boundary 554 between areas $552_1$ and $552_2$ is parallel to the Y-coordinate axis and offset with respect to that axis by distance $\Delta x_2$. In an alternative configuration, phase mask 450 can be oriented so that boundary 554 is oriented at any desired angle with respect to the Y- (or X-) coordinate axis.

The configuration shown in FIG. 5 results in the power of the optical-pump beam being coupled primarily into the $LP_{01}$ and $LP_{11a}$ modes of fiber 490. The relative power partition between these two LP modes depends on the values of D, $\Delta x_1$, and $\Delta x_2$. The spot size (D) is controlled by the magnification (or demagnification) provided by the optical-relay system having lenses 446, 460, and 480 (FIG. 4). The first offset distance ($\Delta x_1$) is controlled by the relative alignment of the various optical elements within optical-pump coupler 440 (FIG. 4). The second offset distance ($\Delta x_2$) is controlled by the position of the phase mask 450 with respect to the optical-pump beam. In one embodiment, optical-pump coupler 440 (FIG. 4) incorporates physical means for adjusting the size of spot 510 and/or changing the first and/or second offset distances. Such physical means may include, for example, one or more translation and/or rotation stages (not explicitly shown in FIG. 4) that enable changes in the relative positions/orientations of polarization scrambler 444, lenses 446, 460, and 480, phase mask 450, dichroic beam combiner 464, and the mount of fiber 490.

Figure 6:
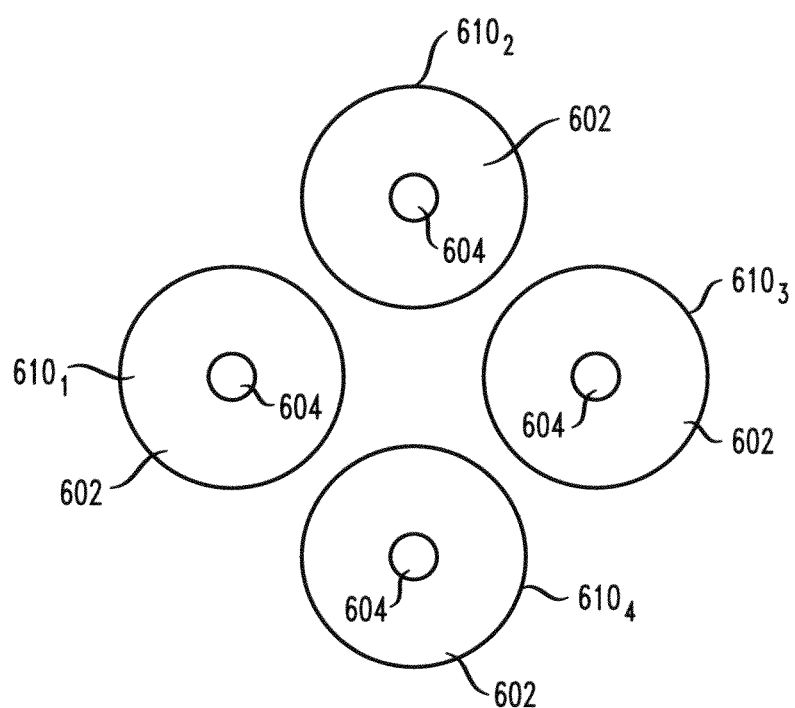
FIG. 6 shows an end-facet view of a waveguide array that can be used in the optical module of FIG. 4 according to one embodiment of the invention.

FIG. 6 shows an end-facet view of a waveguide array 600 that can be used in optical-pump coupler 440 (FIG. 4) according to one embodiment of the invention. More specifically, waveguide array 600 can be configured to direct multiple approximately parallel optical pump beams toward lens 446 (see FIG. 4). In an embodiment having polarization scrambler 444, waveguide array 600 can serve as an output port of the polarization scrambler.

Waveguide array 600 is illustratively shown as having four optical fibers $610_1$-$610_4$. Each fiber 610 has a respective cladding 602 and a respective core 604. The end facets of fibers $610_1$-$610_4$ are arranged in a two-dimensional array as indicated in FIG. 6. Each fiber 610 is configured to emit from its end facet a respective optical-pump beam. The individual optical-pump beams corresponding to different fibers 610 may be individually turned ON or OFF, e.g., by appropriately controlling the optical-pump source(s) coupled to the distal ends of those fibers. In one configuration, at least two of the optical-pump beams corresponding to different fibers 610 may have different respective wavelengths.

In an alternative embodiment, waveguide array 600 may have a different number of waveguides, not necessarily having circular shapes. The waveguides may be arranged in any desired manner, e.g., to form a linear array or a two-dimensional array. Different waveguides in the array may have different core sizes and/or shapes.

Figure 7:
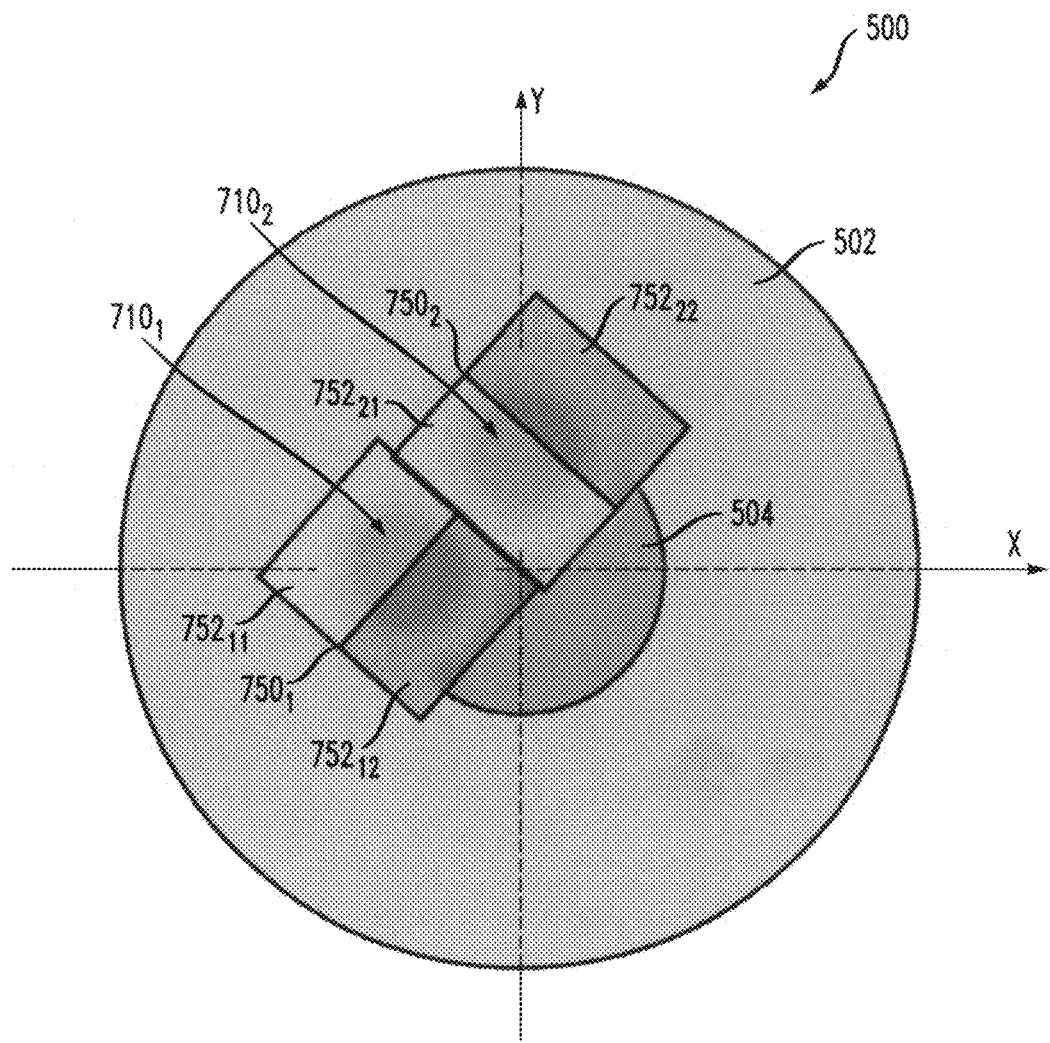
FIG. 7 shows an end facet of a multimode fiber with two pump-beam spots and a corresponding phase pattern according to another representative configuration of the optical module shown in FIG. 4.

FIG. 7 shows end facet 500 of fiber 490 together with pump-beam spots $710_1$ and $710_2$ and a corresponding phase-shift pattern 750 according to another representative configuration of optical-pump coupler 440 (also see FIGS. 4 and 5). Spots $710_1$ and $710_2$ can be generated, e.g., using waveguide array 600 of FIG. 6. More specifically, the optical-pump sources coupled to the distal ends of fibers $610_1$ and $610_2$ are turned ON, while the optical-pump sources coupled to the distal ends of fibers $610_3$ and $610_4$ are turned OFF. As a result, the optical-pump beam emitted from the end facet of fiber $610_1$ generates spot $710_1$, and the optical-pump beam emitted from the end facet of fiber $610_2$ similarly generates spot $710_2$. In other embodiments, the pump-beam spots $710_1$ and $710_2$ may be produced by an embodiment of waveguide array 600 having only two fibers, e.g., $610_1$ and $610_2$. Similar to phase-shift pattern 550 shown in FIG. 5, phase-shift pattern 750 is imposed by a corresponding embodiment of phase mask 450 (FIG. 4). In that embodiment, phase mask 450 is a binary phase mask having two tiles, e.g., non-overlapping rectangular tiles, wherein each tile is configured to produce two phase-shift areas characterized by a relative phase-shift difference between them of about 180 degrees. One of the tiles produces the phase-shift pattern in the area labeled $750_1$, and the other tile produces the phase-shift pattern in the area labeled $750_2$. The relative phase shift between (i) a rectangular portion $752_{11}$ of area $750_1$ and (ii) a corresponding rectangular portion $752_{21}$ of area $750_2$ has a fixed value, which may or may not be zero degrees. The corresponding tiles of phase mask 450 may be configured, e.g., so that (i) a boundary $754_1$ between portions $752_{11}$ and $752_{12}$ of area $750_1$ is oriented at an angle of about 45 degrees with respect to the X-coordinate axis and (ii) a boundary $754_2$ between portions $752_{21}$ and $752_{22}$ of area $750_2$ is orthogonal to boundary $754_1$.

The configuration shown in FIG. 7 results in the power of the two optical-pump beams being coupled primarily into the $LP_{11a}$ and $LP_{11b}$ modes of fiber 490.

The relative power partition between these two LP modes depends on the relative intensities of the two beams, which can be controlled, e.g., by controlling the corresponding light sources.

In various alternative embodiments, phase mask 450 (FIG. 4) may have other tiled configurations. The tiles may or may not have rectangular shapes. The number of tiles may match the number of waveguides in the corresponding waveguide array, e.g., analogous to waveguide array 600 of FIG. 6. Either binary or continuous phase-shift patterns may be used for each tile. Representative phase-shift patterns that can be used to implement different tiles of the phase mask are shown, e.g., in FIG. 4B of the above-cited U.S. Patent Application Publication No. 2010/0329670. In various alternative embodiments, phase mask 450 may be designed to impose any desired phase-shift pattern, which can be based, e.g., on the desired partition of optical-pump power between different LP modes of the corresponding multimode fiber.

Figure 8:
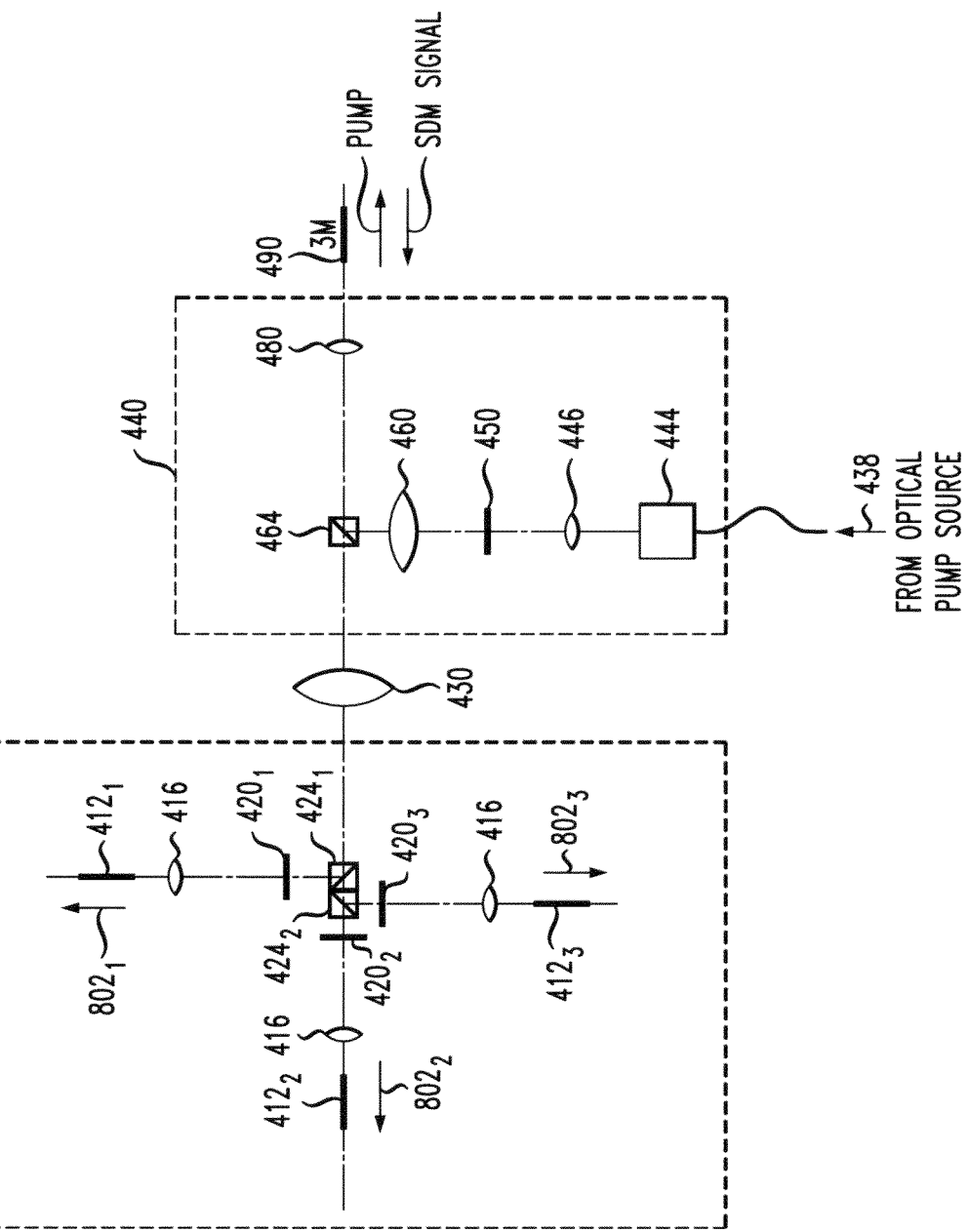
FIG. 8 shows an alternative configuration of the optical module shown in FIG. 4.

FIG. 8 shows an alternative configuration of optical module 400. Optical module 400, configured as indicated in FIG. 8, can be used, e.g., in receiver terminal 140 (FIG. 1) to implement contra-directional pumping of an SRS amplification process. In this case, fiber 490 can be a part of fiber section 106d (FIG. 1).

One difference between the configurations of optical module 400 shown in FIGS. 4 and 8, respectively, is that, in the latter configuration, optical-signal coupler 410 is configured to operate with signals flowing in the direction that is opposite to that in the former configuration. As a result, in the configuration of FIG. 8, optical-signal coupler 410 decomposes the SDM signal relayed to it by lenses 480 and 430 from fiber 490 into three individual SDM components labeled as signals $802_1$-$802_3$, respectively. Each of these signals can then be directed to a corresponding optical detector (not explicitly shown in FIG. 8) for demodulation.

Figure 9:
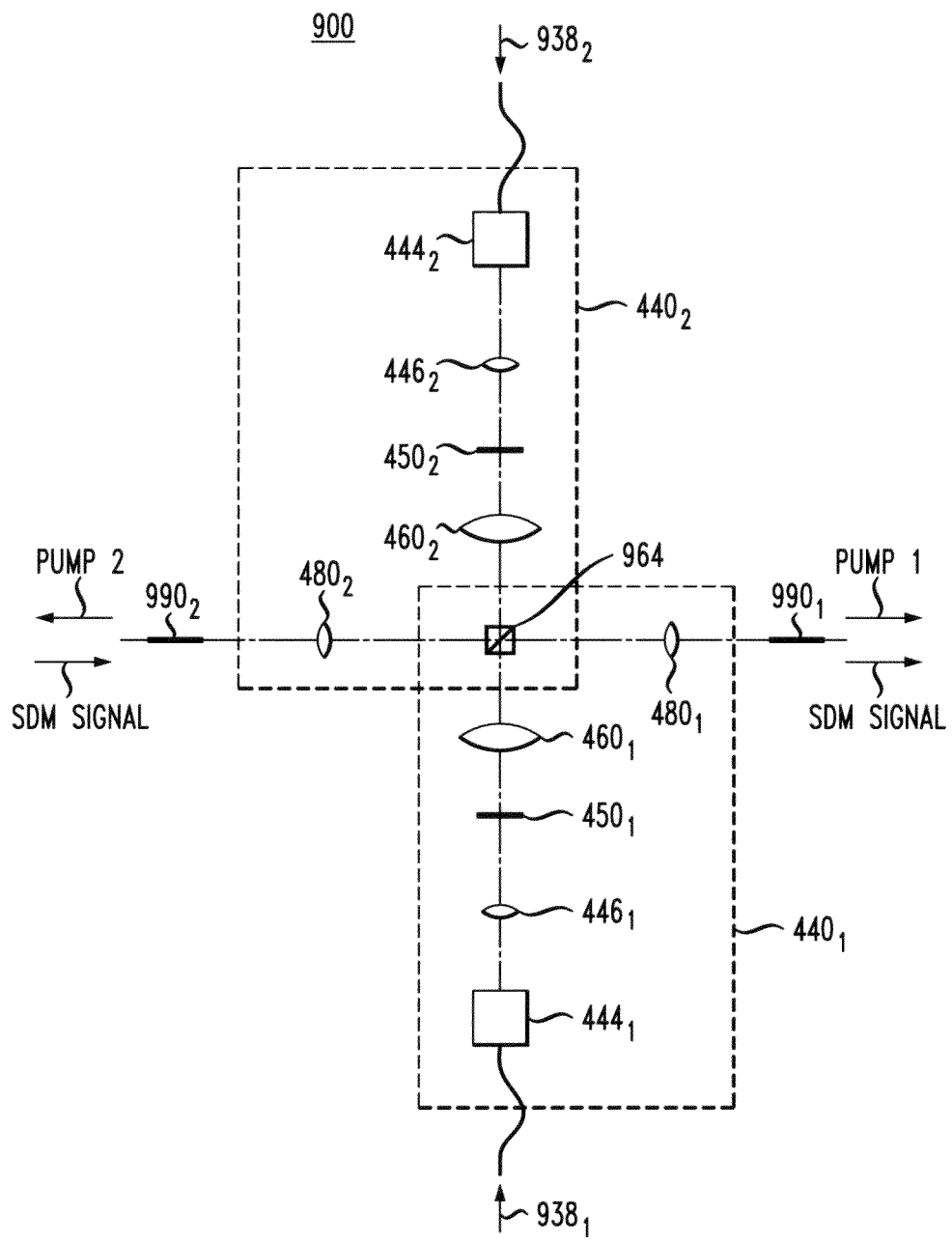
FIG. 9 shows a block diagram of an optical-pump coupler that can be used in a relay station of the transport system shown in FIG. 1 according to one embodiment of the invention.

FIG. 9 shows a block diagram of an optical-pump coupler 900 that that can be used in relay station 120 (FIG. 1) according to one embodiment of the invention. Optical-pump coupler 900 comprises two instances of optical-pump coupler 440 that share a dichroic beam combiner, which is labeled 964 in FIG. 9. Optical-pump coupler $440_1$ is configured to receive an optical-pump signal $938_1$ from an external optical-pump source (e.g., a laser, not explicitly shown in FIG. 9) and couple that pump signal into a multimode fiber $990_1$, e.g., as already described above in reference to FIGS. 4-7. Optical-pump coupler $440_2$ is similarly configured to receive an optical-pump signal $938_2$ from an external optical-pump source and couple that pump signal into a multimode fiber $990_2$. Lenses $480_1$ and $480_2$ (located in optical-pump couplers $440_1$ and $440_2$, respectively) may be configured to relay an SDM signal from fiber $990_2$ to fiber $990_1$. Due to this SDM-signal propagation direction, optical-pump coupler $440_1$ implements co-directional pumping while optical-pump coupler $440_2$ implements contra-directional pumping.

Figure 10:
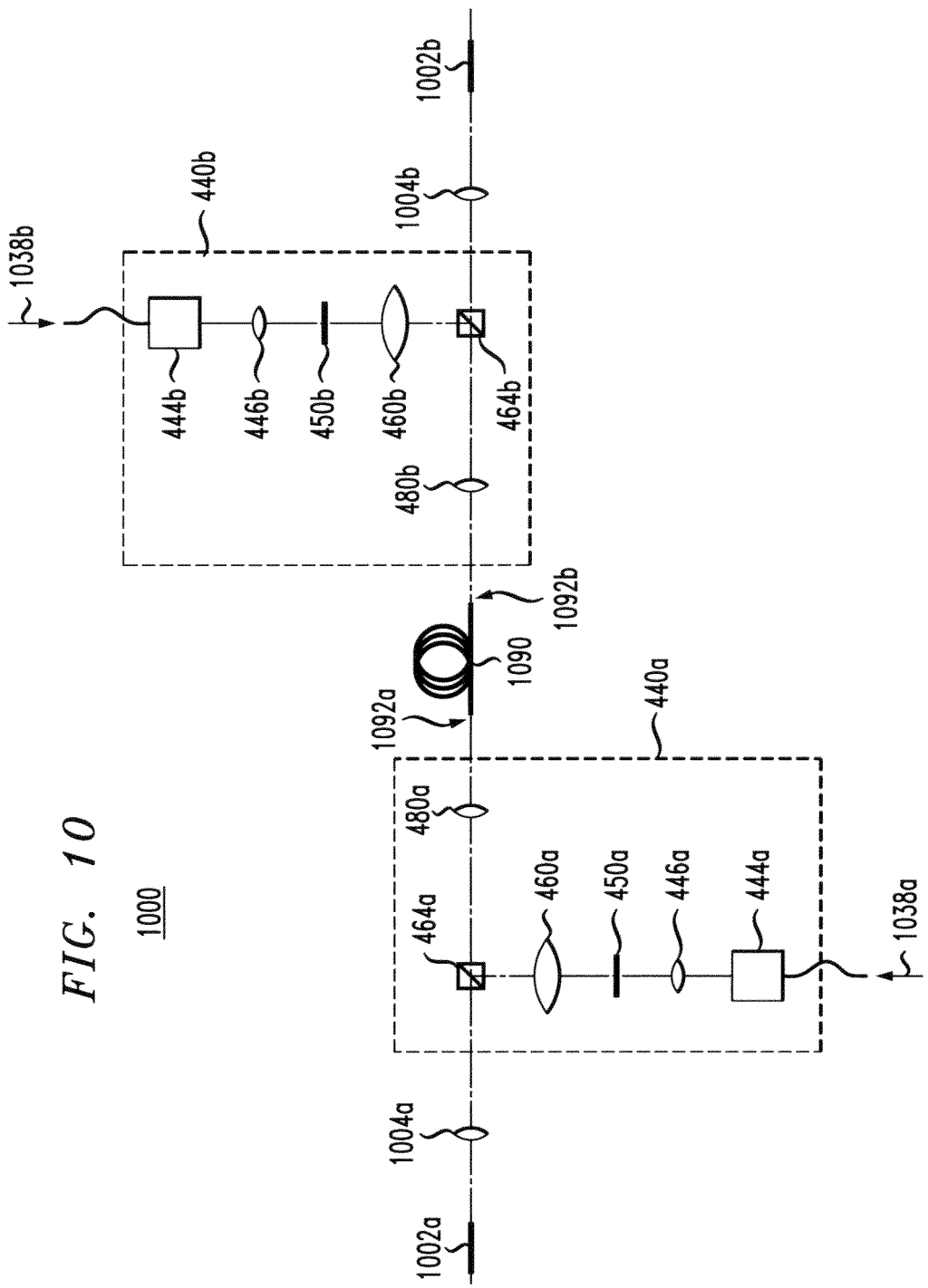
FIG. 10 shows a block diagram of a Raman amplifier that can be used in the optical link of the transport system shown in FIG. 1 according to one embodiment of the invention.

FIG. 10 shows a block diagram of a Raman amplifier 1000 that that can be used in link 104 (FIG. 1) according to one embodiment of the invention. Raman amplifier 1000 comprises two instances of optical-pump coupler 440, labeled 440a and 440b, respectively. Optical-pump coupler 440a is configured to receive an optical-pump signal 1038a from an external optical-pump source (e.g., a laser, not explicitly shown in FIG. 10) and couple that pump signal into an end facet 1092a of a multimode fiber 1090, e.g., as already described above in reference to FIGS. 4-7. Optical-pump coupler 440b is similarly configured to receive an optical-pump signal 1038b from an external optical-pump source and couple that pump signal into an end facet 1092b of a multimode fiber 1090. Fiber 1090 is made of a material (e.g., Ge-doped silica) having a relatively high SRS cross-section. As a result, fiber 1090 can have a relatively short length, which enables amplifier 1000 to be implemented as a lumped amplifier.

An SDM signal may traverse amplifier 1000 in either direction, e.g., from a multimode fiber 1002a to a multimode fiber 1002b, or from multimode fiber 1002b to multimode fiber 1002a. Lenses 1004a and 1004b are configured to appropriately optically couple multimode fibers 1002a and 1002b to optical-pump couplers 440a and 440b, respectively. Regardless of the SDM-signal propagation direction, one of optical-pump couplers 440a and 440b implements co-directional pumping of fiber 1090 while the other one implements contra-directional pumping of the fiber.

In an alternative embodiment, one of optical-pump couplers 440a and 440b may be removed. One of ordinary skill in the art will also understand that an embodiment of amplifier 1000 having a single optical-pump coupler 440 configured for co-directional pumping of the SDM signal can be converted into an Erbium-doped fiber amplifier in a relatively straightforward manner, e.g., by replacing the above-described SRS-optimized fiber 1090 by an appropriate Erbium-doped multimode fiber.

While this invention has been described with reference to illustrative embodiments, this description is not intended to be construed in a limiting sense.

Although various embodiments were described in reference to SDM signals, they can also be practiced with other multimode signals, which may or may not be modulated with data.

Various modifications of the described embodiments, as well as other embodiments of the invention, which are apparent to persons skilled in the art to which the invention pertains are deemed to lie within the principle and scope of the invention as expressed in the following claims.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims. The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The description and drawings merely illustrate the principles of the invention. It will thus be appreciated that those of ordinary skill in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

What is claimed is:

1. An apparatus comprising:
a first optical coupler configured to:
pass an optical beam carrying an optical signal corresponding to a set of guided modes of a first multimode fiber; and
couple optical-pump power into the first multimode fiber so as to partition the optical-pump power among the guided modes of said set; and
wherein the first optical coupler comprises:
a phase mask configured to phase-filter a first optical-pump beam to generate a first phase-filtered beam whose phase varies over a transverse cross section thereof; and
an optical relay system configured to apply the first phase-filtered beam to an end of the first multimode fiber in a manner that causes a geometric center of a spot illuminated on said end by the first phase-filtered beam to be at a predetermined offset distance from a geometric center of said end.

2. The apparatus of claim 1, further comprising a segment of the first multimode fiber.

3. The apparatus of claim 2, wherein the segment of the first multimode fiber is adapted to transfer optical-pump energy to the optical signal via a stimulated Raman-scattering process.

4. The apparatus of claim 2, wherein the segment of the first multimode fiber is adapted to transfer optical-pump energy to the optical signal via a stimulated emission process.

5. The apparatus of claim 1, wherein:
the guided modes comprise a fundamental mode and a higher-order mode; and
the first optical coupler is configured to couple a greater portion of the optical-pump power into the higher-order mode than into the fundamental mode.

6. The apparatus of claim 1, wherein the first optical coupler further comprises a beam combiner configured to spatially overlap the first phase-filtered beam and the optical beam carrying the optical signal.

7. The apparatus of claim 1, wherein the first optical coupler further comprises a polarization scrambler configured to cause the first optical-pump beam to have scrambled polarization.

8. The apparatus of claim 1, wherein:
the first optical coupler further comprises an array of waveguides, wherein:
a first waveguide of the array is configured to output the first optical-pump beam; and
a second waveguide of the array is configured to output a second optical-pump beam;
the phase mask is further configured to phase-filter the second optical-pump beam to generate a second phase-filtered beam whose phase varies over a transverse cross section thereof; and
the optical relay system is further configured to apply the second phase-filtered beam to said end of the first multimode fiber.

9. The apparatus of claim 8, wherein the first optical coupler is configured to apply the second phase-filtered beam to a substantially separate region on said end than the first phase-filtered beam.

10. The apparatus of claim 8, further comprising an optical-pump source configured to cause:

the first optical-pump beam to have a first wavelength, and the second optical-pump beam to have a second wavelength different from the first wavelength.

11. The apparatus of claim 1, wherein the first optical coupler further comprises an adjustable mechanical structure reconfigurable to change a relative position of the first optical-pump beam and the phase mask.

12. The apparatus of claim 1, wherein the first optical coupler further comprises at least one of:
 a module including a bulk optical element and a mechanically adjustable element configured to change location of the spot illuminated by the first phase-filtered beam on said end; and
 a module including a bulk optical element and a mechanically adjustable element for changing a size of said spot.

13. The apparatus of claim 1, wherein the optical phase mask comprises:
 a first area configured to impose a first constant phase shift on light propagating therethrough; and
 a second area configured to impose a second constant phase shift on light propagating therethrough, wherein the second phase shift is different from the first phase shift.

14. The apparatus of claim 1, comprising an optical receiver, wherein the first optical coupler is a part of the receiver.

15. The apparatus of claim 1, comprising an optical transmitter, wherein the first optical coupler is a part of the transmitter.

16. The apparatus of claim 1, comprising a fiber amplifier, wherein the first optical coupler is a part of the fiber amplifier.

17. The apparatus of claim 1, comprising a relay station adapted to transport the optical beam carrying the optical signal between said end of the first multimode fiber and an end of a second multimode fiber, wherein the first optical coupler is a part of the relay station.

18. The apparatus of claim 17, wherein the relay station comprises a second optical coupler configured to couple optical-pump power of a second optical pump into the second multimode fiber through the end thereof, wherein the second optical coupler is configured to partition the optical-pump power of the second optical pump among guided modes of the second multimode fiber populated therein by the optical signal.

19. The apparatus of claim 18, wherein the first optical coupler and the second optical coupler include a shared beam combiner configured to direct in opposite directions the optical power of the first optical pump and the optical power of the second optical pump.

20. An apparatus comprising:
 a first optical coupler configured to:
  pass an optical beam carrying an optical signal corresponding to a set of guided modes of a first multimode fiber; and
  couple optical-pump power into the first multimode fiber so as to partition the optical-pump power among the guided modes of said set; and
 a relay station adapted to transport the optical beam carrying the optical signal between said end of the first multimode fiber and an end of a second multimode fiber;
 wherein the first optical coupler is a part of the relay station; and
 wherein the relay station comprises a second optical coupler configured to couple optical-pump power of a second optical pump into the second multimode fiber through the end thereof, wherein the second optical coupler is configured to partition the optical-pump power of the second optical pump among guided modes of the second multimode fiber populated therein by the optical signal.

21. The apparatus of claim 20, wherein the first optical coupler and the second optical coupler include a shared beam combiner configured to direct in opposite directions the optical power of the first optical pump and the optical power of the second optical pump.

22. An apparatus comprising:
 a first optical coupler configured to:
  pass an optical beam carrying an optical signal corresponding to a set of guided modes of a first multimode fiber; and
  couple optical-pump power into the first multimode fiber so as to partition the optical-pump power among the guided modes of said set; and
 a segment of the first multimode fiber adapted to transfer optical-pump energy to the optical signal via a stimulated Raman-scattering process.

* * * * *